US012266170B2

(12) United States Patent
Costello et al.

(10) Patent No.: US 12,266,170 B2
(45) Date of Patent: Apr. 1, 2025

(54) COMPUTER-GENERATED SUPPLEMENTAL CONTENT FOR VIDEO

(71) Applicant: APPLE INC., Cupertino, CA (US)

(72) Inventors: James Patrick Costello, San Jose, CA (US); Rena Yu Chen, Santa Clara, CA (US); Divya Navaneetha Krishna, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 916 days.

(21) Appl. No.: 17/184,586

(22) Filed: Feb. 24, 2021

(65) Prior Publication Data

US 2021/0326594 A1  Oct. 21, 2021

Related U.S. Application Data

(60) Provisional application No. 63/011,978, filed on Apr. 17, 2020.

(51) Int. Cl.
*G06V 20/20* (2022.01)
*G06T 19/00* (2011.01)
*G06V 20/00* (2022.01)
*G06V 20/40* (2022.01)

(52) U.S. Cl.
CPC ............ *G06V 20/20* (2022.01); *G06T 19/006* (2013.01); *G06V 20/35* (2022.01); *G06V 20/46* (2022.01)

(58) Field of Classification Search
CPC ........ G06V 20/20; G06V 20/35; G06V 20/46; G06T 19/006
See application file for complete search history.

(56) References Cited

U.S. PATENT DOCUMENTS

| | | | |
|---|---|---|---|
| 10,803,832 B2 | 10/2020 | Chung et al. | |
| 2001/0002126 A1* | 5/2001 | Rosenberg | A63F 13/285 345/156 |
| 2001/0030658 A1* | 10/2001 | Rosenberg | G06F 3/011 715/701 |
| 2001/0044858 A1* | 11/2001 | Rekimoto | G06F 3/011 710/1 |
| 2002/0021283 A1* | 2/2002 | Rosenberg | G06F 3/016 345/156 |
| 2003/0016207 A1* | 1/2003 | Tremblay | G06F 3/0484 345/156 |
| 2006/0287025 A1* | 12/2006 | French | A63F 13/843 463/4 |
| 2007/0132785 A1* | 6/2007 | Ebersole, Jr. | A63F 13/213 345/633 |
| 2010/0045619 A1* | 2/2010 | Birnbaum | G06F 3/04845 345/173 |
| 2019/0065027 A1* | 2/2019 | Hauenstein | G06F 3/014 |

(Continued)

FOREIGN PATENT DOCUMENTS

WO   WO-2010009149 A2 *  1/2010  ........... G06F 1/1613

*Primary Examiner* — Nicholas Augustine
(74) *Attorney, Agent, or Firm* — BAKERHOSTETLER

(57) ABSTRACT

Implementations of the subject technology provide systems and methods for displaying virtual content that is supplemental to video content being displayed to a user. The virtual content can be generated based on the video content being displayed, including based on scene content obtained for the video content and/or detected in the video content. The scene content can be identified, by the device providing the supplemental virtual content, in real time during playback of the video content.

20 Claims, 7 Drawing Sheets

(56) References Cited

U.S. PATENT DOCUMENTS

| | | | |
|---|---|---|---|
| 2019/0342632 A1* | 11/2019 | DeFaria | G06T 15/20 |
| 2020/0004401 A1* | 1/2020 | Hwang | G06F 3/04815 |
| 2020/0005026 A1* | 1/2020 | Andersen | A63F 13/428 |
| 2020/0005539 A1* | 1/2020 | Hwang | G06F 3/167 |

* cited by examiner

COMPUTER-GENERATED SUPPLEMENTAL CONTENT FOR VIDEO

CROSS REFERENCE TO RELATED APPLICATIONS

This application claims the benefit of priority to U.S. Provisional Patent Application No. 63/011,978, entitled "Computer-Generated Supplemental Content For Video," filed on Apr. 17, 2020, the disclosure of which is hereby incorporated herein in its entirety.

TECHNICAL FIELD

The present description relates generally to extended reality environments.

BACKGROUND

Augmented reality technology aims to bridge a gap between virtual environments and a physical environment by providing an enhanced physical environment that is augmented with electronic information. As a result, the electronic information appears to be part of the physical environment as perceived by a user. The electronic information is typically provided to augment static objects in the physical environment.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
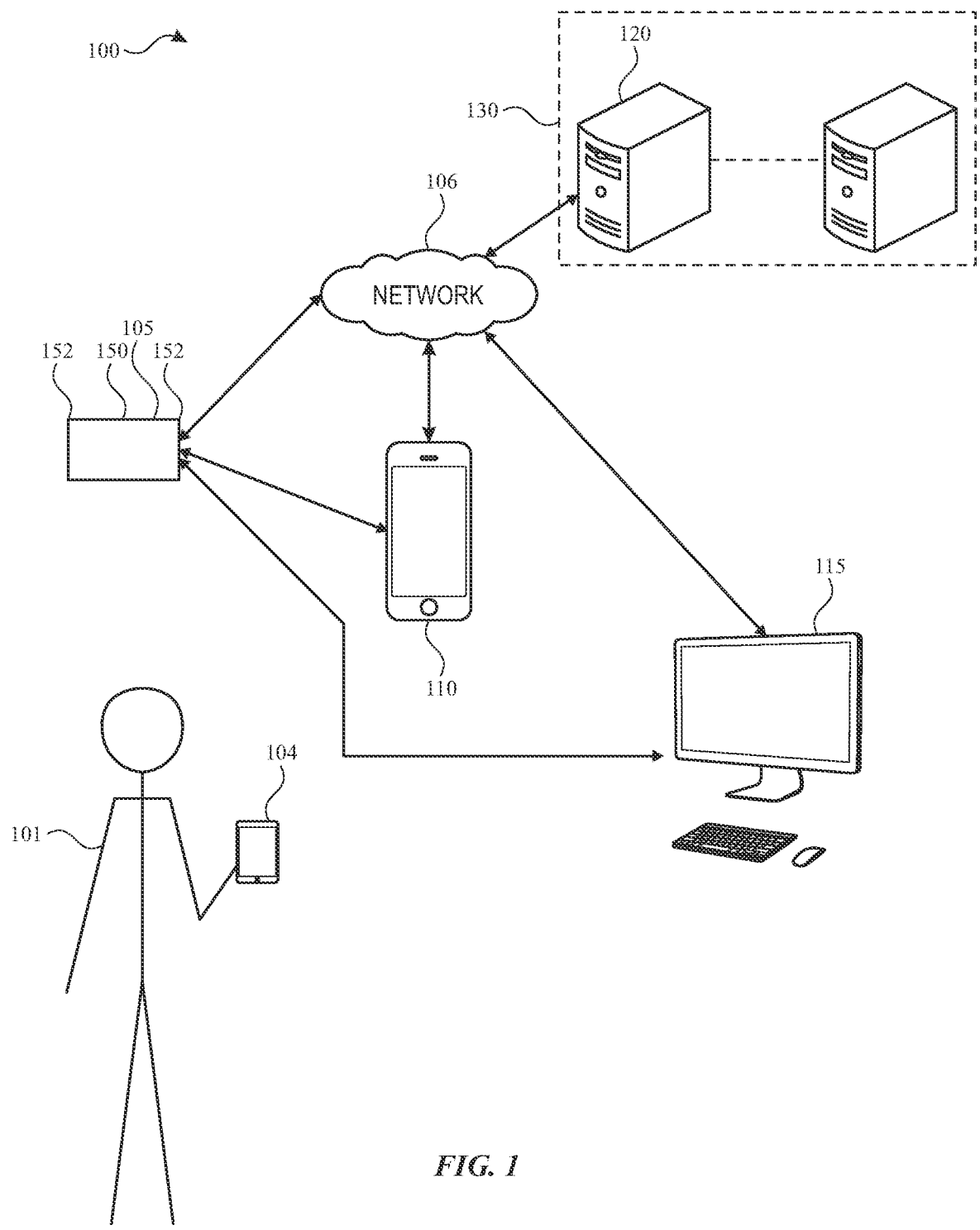
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide an XR system that provides virtual content that is supplemental to video content being displayed in the physical environment. The supplemental virtual content can be displayed, for example, by an electronic device as part of an XR environment that includes the video content being displayed in the physical environment, and the supplemental virtual content. The supplemental virtual content can have characteristics that correspond to attributes of the currently displayed video content. The video content can be displayed on a device other than on the device generating and/or displaying the virtual content, or by the same device that is generating and/or displaying the virtual content.

In some implementations, aspects of the virtual content can be based on parameters known to elicit a particular reaction from a user (e.g., based on prior biometric information). For example, if a loud volume is known (e.g., based on the prior biometric information for a particular user) to increase the user's heart rate, the volume can be increased during certain scenes of horror movies intended to frighten or startle the user. In another example, if the user is known (e.g., based on the prior biometric information) to associate a particular color, hue, and/or brightness with comedies (e.g., based on how often the user laughs while watching prior movies/television shows), the color, hue, and/or brightness of the supplemental virtual content can be adjusted appropriately when the user is watching video content corresponding to a comedy.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, an electronic device 115, and a server 120. For explanatory purposes, the system architecture 100 is illustrated in FIG. 1 as including the electronic device 105, the handheld electronic device 104, the electronic device 110, the electronic device 115, and the server 120; however, the system architecture 100 may include any number of electronic devices and any number of servers or a data center including multiple servers.

The electronic device 105 may be a smartphone, a tablet, or a head mountable portable system (e.g., a head mountable display device that can be worn by a user), that includes a display system capable of presenting a visualization of an extended reality environment to the user. The electronic device 105 may be powered with a battery and/or another power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a handheld electronic device 104, such as a tablet, watch, mobile device, and the like.

The electronic device 105 may include one or more cameras such as camera 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for initiating generating supplemental virtual content within a given extended reality environment. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect a presence of a person or object and/or an occurrence of an event in a scene to initiate providing supplemental virtual content within the extended reality environment.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the generated extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

In an implementation, the electronic device 105 detects video content (e.g., two-dimensional (2D) and/or three-dimensional (3D) video content) being displayed in a physical environment (e.g., on the user's television, another device of the user, or on a movie screen) and generates an extended reality environment including virtual content that is supplemental to the detected video content. The virtual content may supplement the video content by being based on the video content (e.g., based on scene information determined for the video content).

For example, existing movies, television shows, etc. can be enhanced by analyzing content of the movie or television show based on images of the movie or television show as captured by a camera such as camera 150 of electronic device 105. Virtual content can then be generated to provide an XR atmosphere that is reflective of the displayed video content. For example, for a movie scene set in a forest, a VR forest can be generated surrounding the movie screen on the device. The VR forest and/or other VR content can appear to blend into and/or extend from the movie screen displaying the movie (e.g., by displaying CG objects or characters appearing to come out of physical screen displaying the movie). The virtual content can be generated for a specific movie scene by, for example, performing on-device content analysis of images captured by camera 150 of the displayed video content (e.g., without requiring manual editing/creation), and/or by recognizing the specific movie being played and obtaining a VR track that accompanies the video track for that movie (e.g., from a remote server).

The network 106 may communicatively (directly or indirectly) couple, for example, the electronic device 105, the electronic device 110 and/or the electronic device 115 with the server 120. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic device discussed below with respect to the electronic system discussed below with respect to FIG. 8. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 8.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
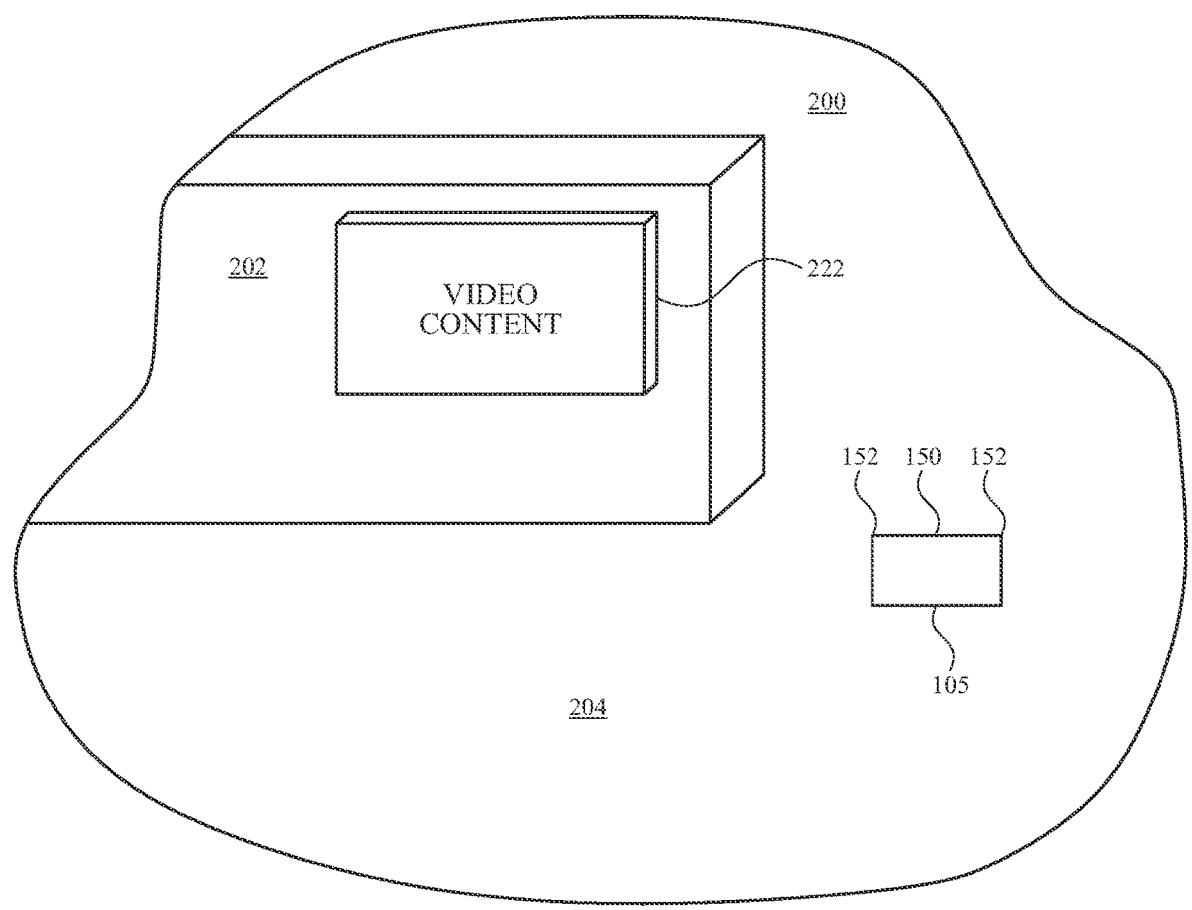
FIG. 2 illustrates an example of a physical environment of an electronic device that includes another device displaying video content in accordance with implementations of the subject technology.

FIG. 2 illustrates an examples physical environment that includes a display device such as a television, on which video content such as movies or television shows can be displayed. In the example of FIG. 2, a user 101 wears an electronic device 105 in a physical environment 200. The physical environment 200, in the example of FIG. 2, includes a physical wall 202, a physical floor 204, and a physical display device 222 that can be detected, mapped, and/or categorized using environment information based on images from one or more cameras such as camera 150 and one or more sensors (e.g., depth sensors) such as sensors 152. In the example of FIG. 2, video content is being displayed by display device 222 at a first location in the physical environment. In this example, one or more cameras of electronic device 105 capture images of the video content being displayed. A microphone of electronic device 105 may also capture audio content associated with the video content being displayed.

Based on the captured images and/or audio information, electronic device 105 identifies at least one attribute of video content playing on display device 222 at the first location in the physical environment 200 of the electronic device 105 and the display device 222.

In one example, identifying the at least one attribute of video content includes obtaining an identifier of the video content. For example, a title, an identification number, a code, or another identifier of a particular movie may be identified based on the captured image and/or audio information (e.g., using a machine-learning model trained to recognize movies and/or television shows in a database from snippets (e.g., a fingerprint) of video and/or audio content). In this example, electronic device 105 may obtain scene information for the video content from a remote server using the identifier. For example, server 120 may store scene information for each movie and/or television show in a content database. The scene information may include, for each of several scenes in a movie or television show, a color palette, a theme, a setting (e.g., a forest, a police station, a doctor's office, a hospital, a meadow, a living room, etc.), identifiers of scene objects (e.g., trees, cars, furniture, etc.), or any other suitable scene information that can be used to generate virtual content corresponding to the scene content.

In another example, electronic device 105 may identify the scene information directly from the images of the video content (e.g., without identifying a particular movie or television show). In this example, identifying the at least one attribute of the video content may include identifying, at the electronic device 105, scene information for the video content based on one or more features of an image of the video content from the camera 150.

Once attributes of particular video content (e.g., including scene information for the video content) have been identified (e.g., directly from images of the video content or based on scene information specifically for a particular title), electronic device 105 may generate virtual content that is supplemental to the video content for display in an XR environment that includes the physical display device 222. In some cases, when a particular title is identified, a virtual content track for that title, and/or instructions for generating the virtual content, can be obtained and use to generate the virtual content.

Figure 3:
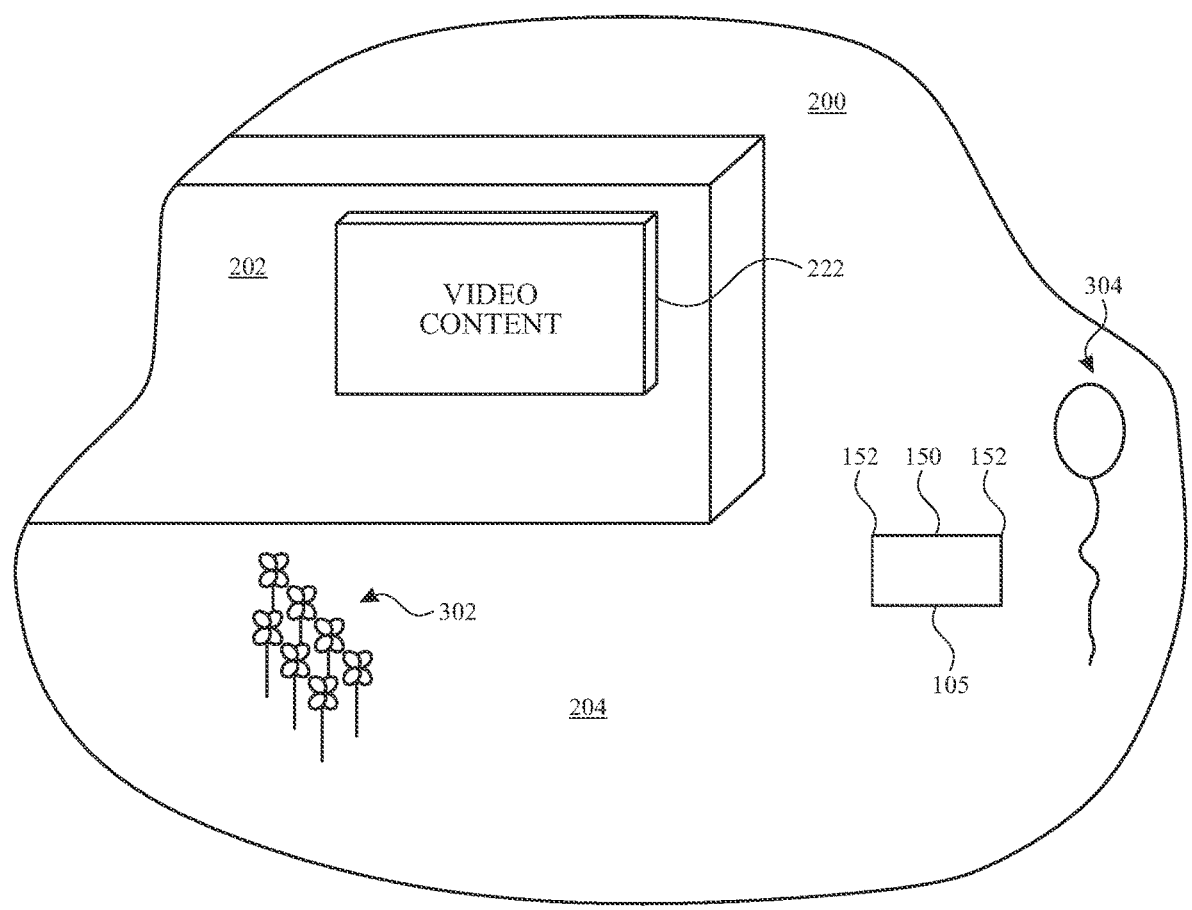
FIG. 3 illustrates virtual content that is supplemental to the video content in accordance with implementations of the subject technology.

FIG. 3 illustrates an example of an XR environment that includes virtual content, displayed by electronic device 105, based on video content playing on display device 222. As shown in the example of FIG. 3, while the video content that has been recognized and/or identified is playing on display device 222 in physical environment 200, electronic device 105 is displaying virtual content that corresponds to the video content. In some operational scenarios, the virtual content can be generated without user interaction. In other operational scenarios, the user may be provided with an option to begin generating the virtual content (e.g., the user may be provided with an option to purchase the virtual content as an add-on to the video content).

In the example of FIG. 3, the virtual content includes virtual flowers 302 displayed to appear as though they are growing out of the physical floor 204, and a virtual balloon 304 displayed to appear as though it is floating around the physical environment 200. Virtual content such as virtual flowers 302 and virtual balloon 304 may be generated by electronic device 105 when, for example, the video content currently playing on display device 222 is a wedding scene that includes flowers and balloons. Virtual flowers 302 may be generated to mimic the type and color of flowers that are in the displayed video content. Virtual balloon 304 may have a size, a texture, and a color that mimics the size, texture, and color of balloons in the video content. Supplemental environmental content such as virtual flowers 302 and/or virtual balloon 304 may be animated (e.g., virtual flowers 302 and/or virtual balloon 304 added to the environment can appear to blow in the wind if wind is identified in the movie scene and/or in coordination with movement of the flowers and balloons in the video content). In some implementations, audio detected from the video content (e.g., the movie sound track) can be used as input to a machine learning engine to identify animations for the supplemental content (e.g., the sound of wind detected in the movie soundtrack by electronic device 105 can be used to cause the virtual flowers 302 to move as if in a wind).

The flowers and balloons in the video content can be identified directly by electronic device 105 (e.g., by providing images of the video content to a machine learning engine that is trained to identify scene objects including balloons and flowers from images, or by providing images and/or audio of the video content to a machine learning engine (and/or fingerprint matching algorithm) that is trained to identify a particular title from the images and then obtaining scene information for that identified title). A library of virtual objects (e.g., including meshes, textures, materials, etc. for various categories of objects) can be used to generate the supplemental virtual content in the XR environment that includes physical environment 200 and the supplemental virtual content.

In the example of FIG. 3, the virtual content is mixed reality (MR) content that is displayed based known features of physical environment (e.g., as mapped by depth sensors and/or cameras of electronic device 105). However, in other examples, the virtual content may be entirely virtual (e.g., by blocking out the user's view of the physical environment other than the video content and displaying the virtual content in an overlaid virtual environment, and/or by pulling the display of the video content from display device 222 onto the display of electronic device 105). In various operational scenarios, supplemental environment content can be fully VR, or can be MR (e.g., supplemental trees can grow out of the coffee table).

In the example of FIG. 3, virtual flowers 302 and virtual balloon 304 are depicted as being three-dimensional (3D) supplemental content. In other scenarios, two-dimensional (2D) supplemental virtual content can be generated in addition to, or instead of the 3D virtual content. For example, the virtual flowers and balloon can be generated as two-dimensional virtual objects that appear to be displayed on the walls of the physical environment 200. In some operational scenarios, the supplemental VR content can include enhancements to 3D content in a 3D movie. For example, water flowing out of the screen in the 3D video content that would appear to extend a short distance from the display device can be extended in the supplemental VR content to appear to flow around and/or over the viewer.

As discussed herein, the virtual flowers 302 and the virtual balloon 304 may be specific to a wedding scene (or a birthday scene or other party scene) in the video content. When the scene changes in the movie, the virtual flowers 302 and virtual balloon 304 can be replaced with new VR content corresponding to the next scene in the video content (e.g., by generating virtual cars driving next to the user if the next scene is a highway scene). In order to avoid causing discomfort or disorientation for the user, electronic device 105 can anticipate scene changes in the video content (e.g., by identifying an upcoming scene change in the video content) and fade out/in the supplemental VR environmental content over a time surrounding the video content scene transitions that may be more abrupt. For example, the virtual flowers and balloon of the example of FIG. 3 may begin to fade out or become more transparent in advance of the end of the wedding scene and the beginning of the highway scene. Virtual cars for the upcoming highway scene may being to be displayed (e.g., with decreasing transparency) prior to the beginning of the highway scene.

As illustrated in the example of FIG. 3, electronic device 105 can generate virtual content based on at least one attribute of video content being displayed by display device 222 at a first location in the physical environment (e.g., the location of display device 222). Electronic device 105 can then display the generated virtual content overlaid on the physical environment 200 at a second location while the video content is playing on the second device at the first location.

It should be appreciated that, although the example of FIGS. 2 and 3 includes scene content detection and/or virtual content generation by electronic device 105, any or all of a handheld electronic device 104, an electronic device 110, an electronic device 115, and a server 120 can perform any or all of the operations described in connection with these examples. For example, one or more images and/or audio information associated with the video content can be provided to one or more of handheld electronic device 104, electronic device 110, electronic device 115, and server 120 to offload some or all of the processing operations described herein.

Figure 4:
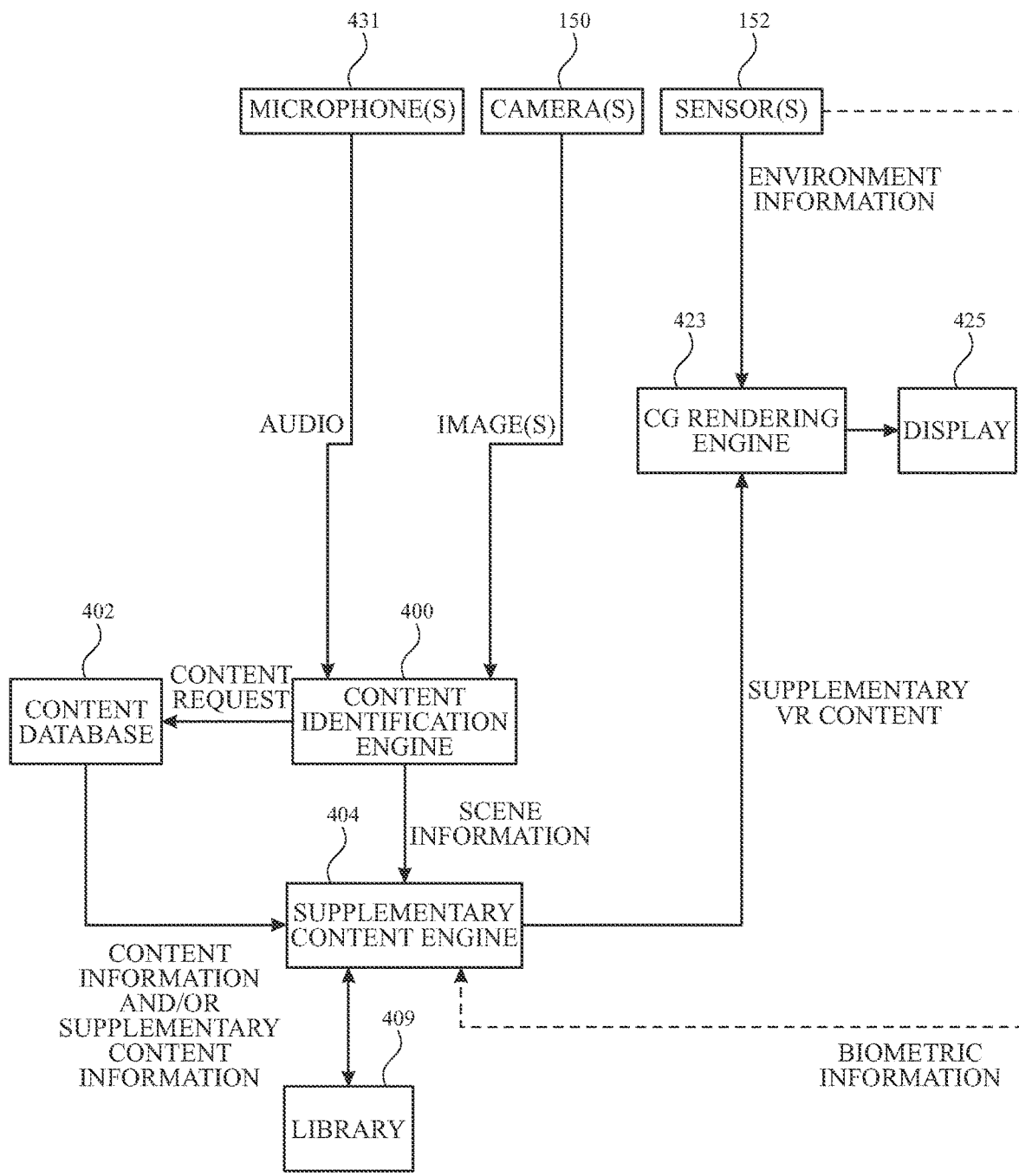
FIG. 4 illustrates aspects of an example software architecture in accordance with one or more implementations of the subject technology.

FIG. 4 illustrates an aspects of example software architecture that may be implemented on the electronic device 105, the electronic device 115, and/or the server 120 in accordance with one or more implementations of the subject technology. For explanatory purposes, the software architecture is described as being implemented by the electronic device 105 and the server 120 of FIG. 1, such as by a processor and/or memory of the electronic device 105 and the server 120; however, appropriate portions of the software architecture may be implemented by any other electronic device, including the electronic device 110 and/or the handheld electronic device 104. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 4, one or more cameras such as camera 150 and/or one or more microphones 431 of electronic device 105 may provide, respectively, image(s) and/or audio information associated with video content being displayed in a physical environment to a content identification engine 400. Content identification engine 400 may be local to electronic device 105 or may be implemented remotely (e.g., at server 120). Content identification engine 400 may include, for example, a machine-learning engine (e.g., located at electronic device 105) that is trained to identify and categorize scenes, scene types (e.g., a forest scene, a beach scene, an office scene, etc.), and/or scene objects (e.g., trees, oceans, desks, etc.) from images and/or audio information from camera 150 and/or microphones 431. Content identification engine 400 may also, or alternatively, include, for example, a machine-learning engine (e.g., located on a remote server such as server 120) that is trained to identify particular movies, television shows, and/or other video content and provide an identifier for that content and/or a current playback time/runtime of the video content.

In examples in which content identification engine 400 directly identifies the scene information from the images and/or audio information, the scene information can be provided to a supplementary content engine 404. Supplementary content engine 404 may identify virtual reality library objects (e.g., virtual trees, flowers, balloons, etc.) in a VR library 409 that can be selected, multiplied, randomized, and/or modified and added to the XR environment as supplemental VR content around the video content during display of each scene.

Content identification engine 400 can also detect individual scene objects and object types and/or characteristics in the video content (e.g., cirrus or cumulonimbus of clouds in a scene). Based on the identified scene object types and characteristics from content identification engine 400, supplementary content engine 404 can generate VR content with types and characteristics that match the identified objects in the video content (e.g., VR clouds can be generated in the environment that match the type of clouds of clouds in the scene).

In examples in which a particular title is identified by content identification engine 400 (e.g., a particular movie or a particular television show), content identification engine 400 can provide a content request (e.g., including an identifier of the video content and/or a current playback time/runtime of the video content) to a content database 402. Content database 402 may be provided by, for example a content owner or a content distributor, and may include metadata for each particular title that describes the scene content in each scene of the title, or that identifies supplementary VR content that has already been prepared for that title (e.g., by the content owner). If content information is obtained from content database 402 (e.g., responsive to the content request from content identification engine), supplementary content engine 404 may identify and generate the supplemental VR content by identifying similar virtual content available from VR library 409.

In scenarios in which the supplementary content is provided directly from content database 402 (e.g., as a VR track that corresponds to video and/or audio tracks of an identified title), supplementary content engine 404 may generate the supplementary VR content specified in the supplementary content information from content database 402. In one example implementation of these scenarios, for playback of the VR track, an initial large download of virtual environments can be provided to electronic device 105, and then an additional streaming track can be provided during the display of the video content with minimal information to call the environments at the right times for rendering and display.

As illustrated in FIG. 4, a CG rendering engine 423 may render the supplemental VR content for display by a display 425 of electronic device 105, using environment information from one or more sensors such as sensors 152 of electronic device 105. For example, CG rendering engine 423 may render portions of the supplementary VR content that are in the field of view of the user 101 of electronic device 105 at any given time. The portions of the supplementary VR content that are in the field of view of the user 101 of electronic device 105 may be rendered based on depth information such as a map of the physical environment based on the environment information from sensors 152 (e.g., so that virtual flowers 302 can be rendered and displayed to appear to be growing out of the physical floor 204).

As indicated in FIG. 4, in some implementations, sensors 152 may include biometric sensors (e.g., heart rate sensors, temperature sensors, etc.) that provide biometric information to supplementary content engine 404. In these implementations, some or all of the supplementary VR content that is generated by supplementary content engine 404 may be user-specific VR content.

The user-specific VR content may, for example, be supplemental VR content having colors, themes, and/or particular objects identified specifically for a user, based on user inputs, detected user characteristics, and/or user-identified preferences. Detected user characteristics can be based on prior biometric data such as heart rate data obtained during other VR or movie-viewing experiences. For example, if a particular type of object (e.g., a snake) is known to increase the user's heart rate, the supplemental VR content in a scary forest scenes of a movie can include a virtual snake to enhance the scary scene. For another user, a bear or a bat or another VR object known to increase the heart rate of that other user can be generated, at the same time and location that the snake would be provided to the first user. In this way, each of several users (e.g., whether viewing the same video content together at a common time in a shared experience, or separately at different times) can view different virtual content that is generated to elicit a common response at the common time during the playing of the video content (e.g., at a particular moment in a movie).

User-specific modifications to the supplemental VR content can be generated locally by electronic device 105, such as based on locally stored biometric data for the user of that electronic device 105, in order to protect the privacy of that user. For example, users may be provided with an opt-in option to allow VR content to be generated and/or modified based on prior biometric data for that user.

Figure 5:
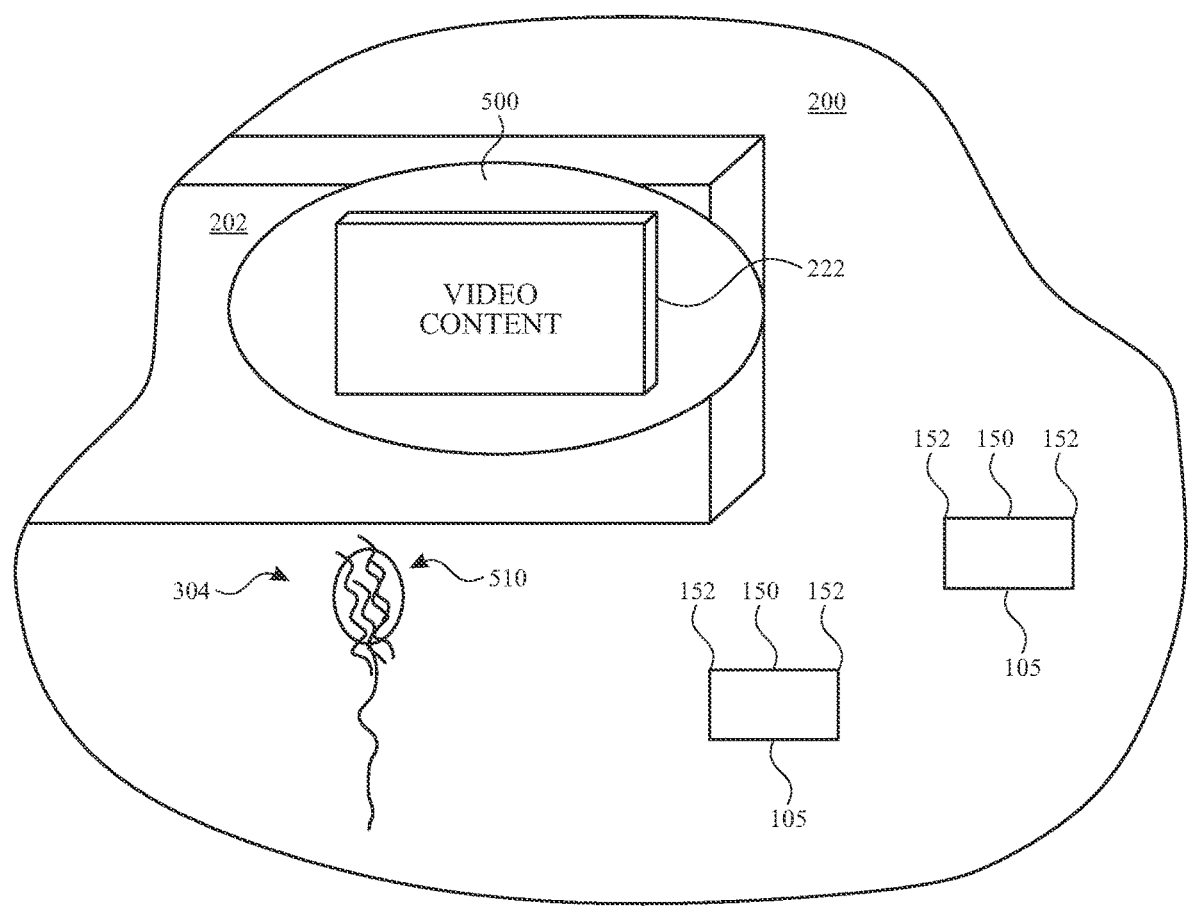
FIG. 5 illustrates an extended reality (XR) environment for multiple users and illustrating a virtual barrier between video content and supplemental virtual content in an XR environment in accordance with implementations of the subject technology.

FIG. 5 illustrates an example in which supplemental VR content is generated specifically for each of multiple users (e.g., based on prior or current biometric information for each user) at a common time and a common location. In the example of FIG. 5, two users 101, each viewing the same video content on display device 222 at a first location in physical environment 200, are provided, by their own electronic device 105, with supplemental virtual content that is specific to that user, displayed at a common location and at a common time.

In this example, the video content may be a party scene. Based on prior biometric data for a first one of users 101 that indicates that balloons elicit a happy response from that user, a virtual balloon 304 is displayed at a second location in the XR environment to elicit the happy response and enhance the first user's experience of viewing the party scene in the video content. At the same time, and the same location, based on prior biometric data for a second one of users 101 that indicates that streamers elicit a happy response from that user, virtual streamers 510 are displayed to elicit the happy response and enhance that second user's experience of viewing the party scene in the video content. Because, although both users see the same video content, each user only sees their own user-specific virtual content, the privacy of each user is protected in regards to the user-specific virtual supplemental content. In an example of a scary scene for shared viewing with multiple VR devices, two users may see two different scary VR objects appear at the same location in the VR scene. Both users may be able to see that they are each startled by something at the same location at the same time, without being privy to what specifically was determined to startle the other user.

FIG. 5 also illustrates how, in some operational scenarios, a virtual barrier 500 can also be provided between the video content on display device 222 and the virtual supplemental content. Virtual barrier 500 may be overlaid on an additional fixed portion of the physical environment 200 that extends around a perimeter of the first location of display device 222, and the second location at which virtual supplemental content is displayed is outside the virtual barrier. Virtual barrier 500 may be displayed by displaying virtual content of a single color (e.g., black) that is overlaid on the additional fixed portion of the physical environment. In this way, the virtual content can be provided in the peripheral vision of the user when the user is focused on the video content, to enhance rather than distract from the video content in some scenarios. When the user moves the device or turns their head, the video content (and the virtual barrier if one is displayed) stays in place, while more of the supplemental VR content at other locations around the user (e.g., and beyond the virtual barrier if one is displayed) can be rendered, displayed, and seen by the user.

Figure 6:
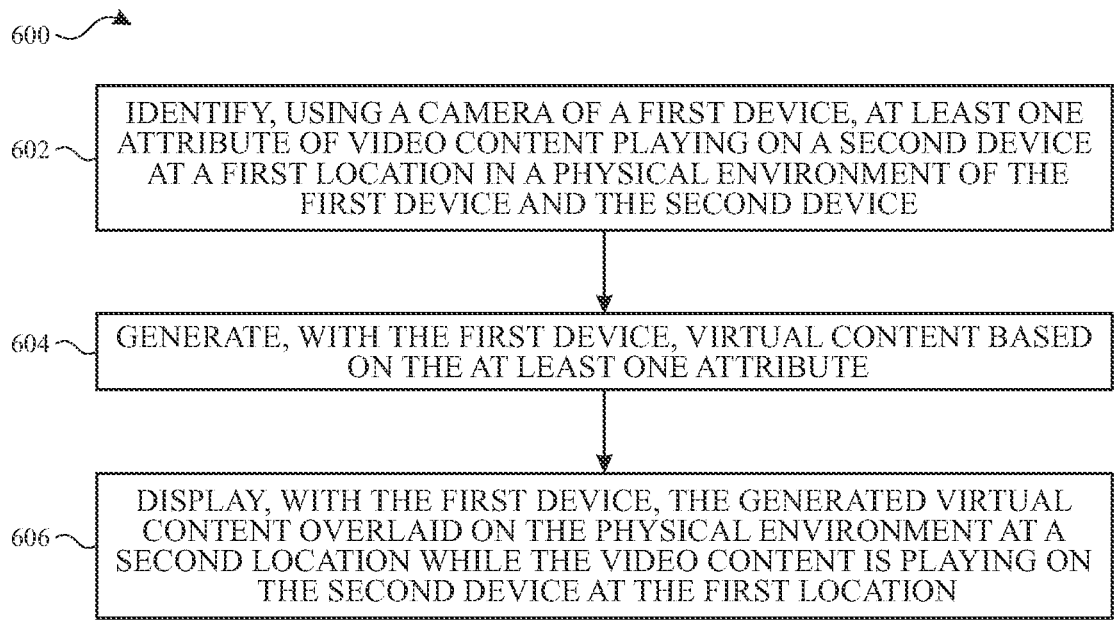
FIG. 6 illustrates a flow chart of an example process for providing supplemental virtual content for video in accordance with implementations of the subject technology.

FIG. 6 illustrates a flow diagram of an example process 600 for providing supplementary VR content for video content in accordance with implementations of the subject technology. For explanatory purposes, the process 600 is primarily described herein with reference to the electronic device 105 of FIGS. 1 and 4. However, the process 600 is not limited to the electronic device 105 of FIGS. 1 and 4, and one or more blocks (or operations) of the process 600 may be performed by one or more other components of other suitable devices, including the electronic device 105, the electronic device 110, the electronic device 115, and/or the servers 120. Further for explanatory purposes, some of the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

As illustrated in FIG. 6, at block 602, using a camera of a first device, such as camera 150 of electronic device 105, at least one attribute of video content playing on a second device (e.g., display device 222) at a first location in a physical environment (e.g., physical environment 200) of the first device and the second device is identified (e.g., by content identification engine 400 of FIG. 4). Identifying the at least one attribute of the video content may include, for example, obtaining an identifier of the video content. In scenarios in which an identifier of the video content is obtained, a current playback time of the video content can also be obtained. Identifying the at least one attribute of the video content may include, as another example, identifying, at the first device, scene information for the video content based on one or more features of an image of the video content from the camera.

At block 604, with the first device (e.g., with supplementary content engine 404), virtual content (e.g., virtual flowers 302 and/or virtual balloon 304) is generated based on the at least one attribute. Generating the virtual content may include obtaining scene information for the video content from a remote server using the identifier and/or an indication of a current playback time of the video content, and generating the virtual content with at least one characteristic that corresponds to the scene information. Generating the virtual content may include obtaining, from a remote server and using the identifier, supplemental content information for the video content, and generating the virtual content based on the obtained supplemental content information and environment information from at least one sensor of the first device. Generating the virtual content may include generating, at the first device, the virtual content with at least one characteristic that corresponds to the scene information.

At block 606, with the first device, the generated virtual content is displayed (e.g., using CG rendering engine 423 and display 425) overlaid on the physical environment at a second location while the video content is playing on the second device at the first location.

In accordance with aspects of the disclosure, the first device (e.g., electronic device 105) may identify a change in the video content, and modify the virtual content based on the identified change. Identifying the change may include identifying an upcoming scene change in the video content, and modifying the virtual content may include modifying the virtual content based on the upcoming scene change in the video content, prior to the scene change in the video content.

In accordance with aspects of the disclosure, the first device (e.g., electronic device 105), may display a virtual barrier such as virtual barrier 500 of FIG. 5, overlaid on an additional fixed portion of the physical environment that extends around a perimeter of the first location, where the second location is outside the virtual barrier. The virtual barrier may include virtual content of a single color (e.g., black) that is overlaid on the additional fixed portion of the physical environment.

In accordance with aspects of the disclosure, the first device (e.g., electronic device 105), may obtain biometric information for a user of the first device from at least one sensor (e.g., one or more of sensors 152) of the first device. Generating the virtual content may include generating the virtual content based on the at least one attribute and the biometric information.

In accordance with aspects of the disclosure, with a third device (e.g., an additional electronic device 105 of an additional user), additional biometric information for the additional user of the third device may be obtained. The third device may generate additional virtual content based on the at least one attribute and the additional biometric information. The third device may display the generated additional virtual content overlaid on the second location in the physical environment while the video content is displayed at the first location as in the example of FIG. 5. The virtual content may be the same as or different than the additional virtual content. The virtual content and the additional virtual content may be displayed at a common time. The virtual content and the additional virtual content may be generated to elicit a common response (e.g., fear, laughter, comfort, etc.) from the user and the additional user, respectively, at the common time.

Figure 7:
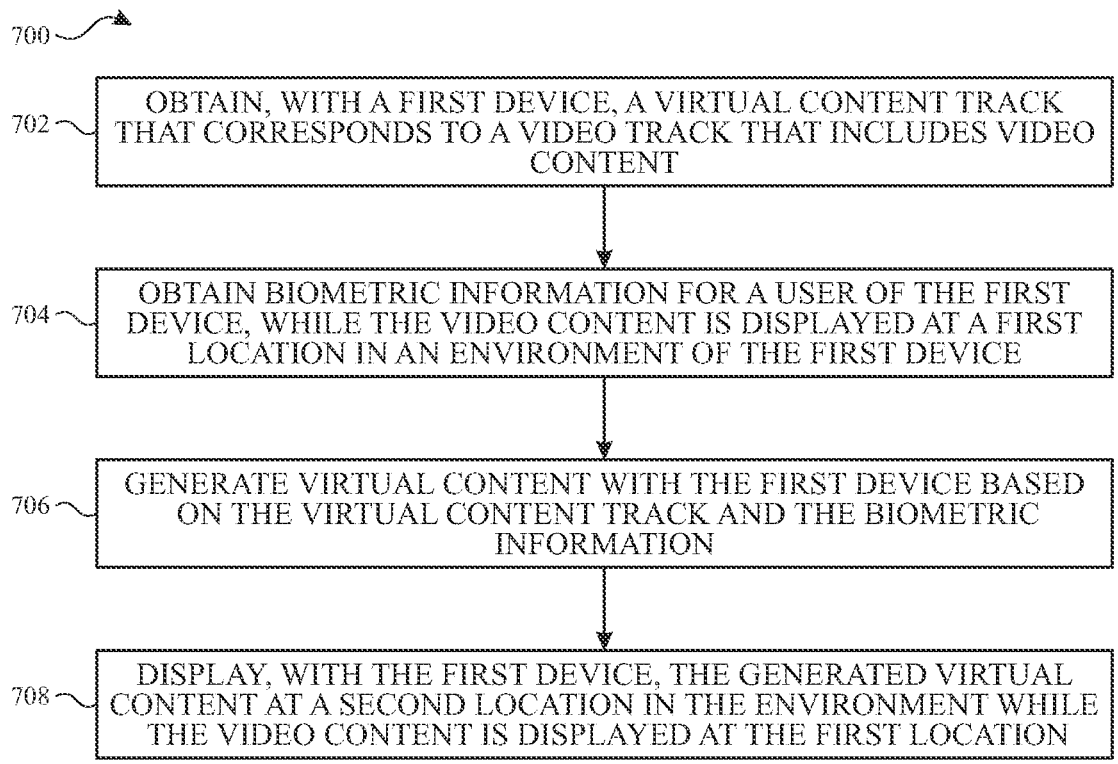
FIG. 7 illustrates a flow chart of an example process for providing supplemental virtual content for video using biometric information in accordance with implementations of the subject technology.

FIG. 7 illustrates a flow diagram of an example process 700 for providing user-specific supplemental virtual content for video content in accordance with implementations of the subject technology. For explanatory purposes, the process 700 is primarily described herein with reference to the electronic device 105 of FIGS. 1 and 4. However, the process 700 is not limited to the electronic device 105 of FIGS. 1 and 4, and one or more blocks (or operations) of the process 700 may be performed by one or more other components of other suitable devices, including the electronic device 105, the electronic device 110, the electronic device 115, and/or the servers 120. Further for explanatory purposes, some of the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

As illustrated in FIG. 7, at block 702, with a first device (e.g., electronic device 105), a virtual content track that corresponds to a video track that includes video content may be obtained. The virtual content track may be provided from a remote server having been generated by a provider of the video track, or may be generated, in real time, at the first device (e.g., based on one or more images and/or audio associated with the video content).

At block 704, the first device may obtain biometric information for a user of the first device (e.g., using one or more sensors of the first device such as sensors 152 of electronic device 105, and or from prior biometric information stored at the first device), while the video content is displayed at a first location (e.g., the location of a display device 222 of FIG. 2 or at a fixed location determined by electronic device 105 for display by display 425 of electronic device 105) in an environment of the first device.

At block 706, the first device may generate virtual content (e.g., virtual flowers 302, virtual balloon 304, or virtual streamers 510) based on the virtual content track and the biometric information.

At block 708, the first device may display the generated virtual content at a second location in the environment while the video content is displayed at the first location.

In accordance with aspects of the disclosure, with a second device (e.g., an additional electronic device 105 of an additional user), additional biometric information for an additional user of the second device may be obtained. The second device may generate additional virtual content based on the virtual content track and the additional biometric information. The second device may display the generated additional virtual content at the second location in the environment while the video content is displayed at the first location. As described in connection with the example of FIG. 5, the virtual content may be the same as, or different than the additional virtual content. The virtual content and the additional virtual content may be displayed at a common time. The virtual content and the additional virtual content may be generated to elicit a common response from the user and the additional user, respectively, at the common time.

As described above, one aspect of the present technology is the gathering and use of data available from specific and legitimate sources for generating supplemental virtual content. The present disclosure contemplates that in some instances, this gathered data may include personal information data that uniquely identifies or can be used to identify a specific person. Such personal information data can include video data, three-dimensional geometry data, demographic data, location-based data, online identifiers, telephone numbers, email addresses, home addresses, biometric data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for generating user-specific XR experiences.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case generating user-specific supplemental VR content, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
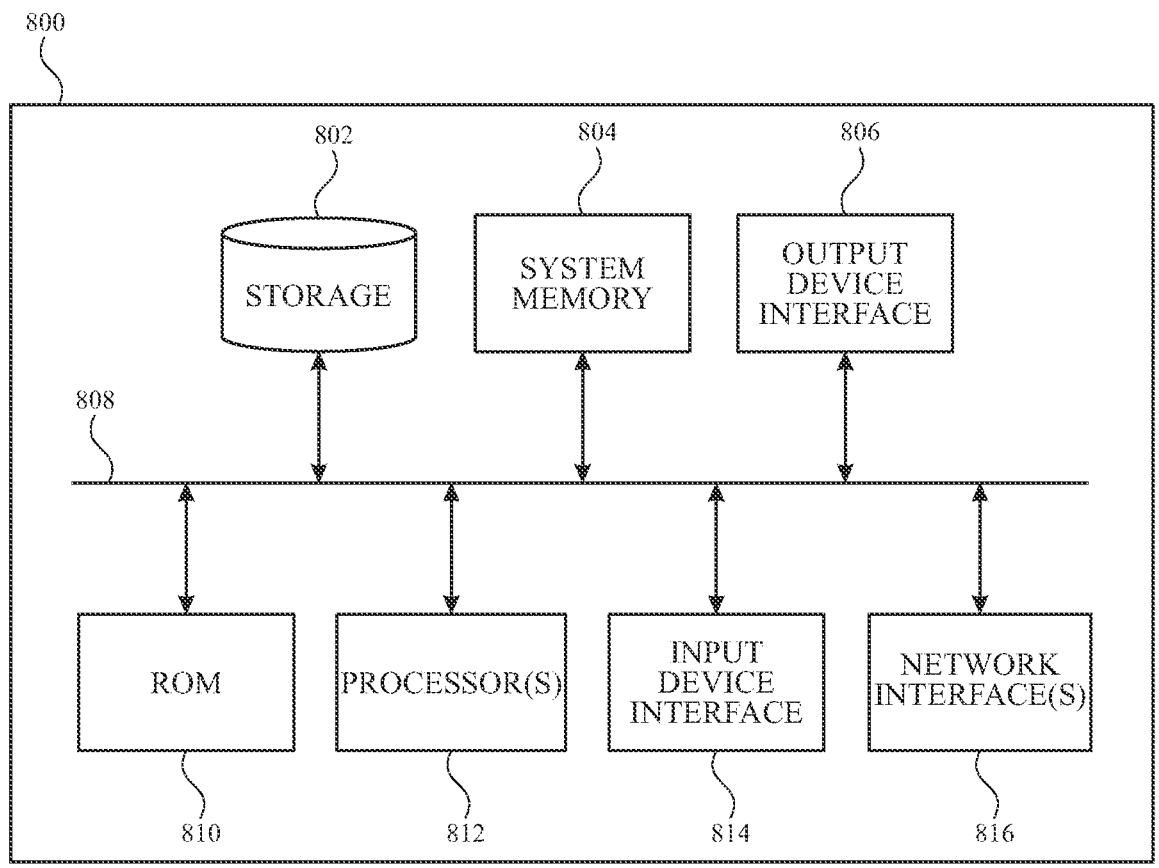
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, the electronic device 105, the handheld electronic device 104, the electronic device 110, the electronic device 115, and/or the server 120 as shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810 (which are each implemented as a non-transitory computer-readable medium). From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 110 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

In accordance with aspects of the disclosure, a method is provided that includes identifying, using a camera of a first device, at least one attribute of video content playing on a second device at a first location in a physical environment of the first device and the second device; generating, with the first device, virtual content based on the at least one attribute; and displaying, with the first device, the generated virtual content overlaid on the physical environment at a second location while the video content is playing on the second device at the first location.

In accordance with aspects of the disclosure, a method is provided that includes obtaining, with a first device, a virtual content track that corresponds to a video track that includes video content; obtaining biometric information for a user of the first device, while the video content is displayed at a first location in an environment of the first device; generating virtual content with the first device based on the virtual content track and the biometric information; and displaying, with the first device, the generated virtual content at a second location in the environment while the video content is displayed at the first location In accordance with aspects of the disclosure, a device is provided that includes a camera; one or more processors; and memory storing instructions that, when executed by the one or more processors causes the one or more processors to: identify, using the camera, at least one attribute of video content playing on another device at a first location in a physical environment of the device and the other device; generate virtual content based on the at least one attribute; and provide the generated virtual content for display overlaid on the physical environment at a second location while the video content is playing on the other device at the first location.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A method, comprising:
   identifying, using at least one of a camera or a microphone of a first device, scene information for a video content currently playing on a second device at a first location in a physical environment of the first device and the second device based at least in part on one or more features of an image of the video content obtained from the camera or corresponding audio content obtained from the microphone;
   generating, with the first device, virtual content based on the scene information;
   displaying, with the first device, the generated virtual content overlaid on the physical environment at a second location while the video content is currently playing on the second device at the first location;
   identifying, with the first device, a scene change in the video content currently playing on the second device; and
   dynamically modifying, by the first device, the generated virtual content based on the identified scene change in the video content.

2. The method of claim 1, wherein identifying the at least one attribute of video content comprises obtaining an identifier of the video content.

3. The method of claim 2, further comprising obtaining scene information for the video content from a remote server using the identifier.

4. The method of claim 3, wherein generating the virtual content comprises generating, at the first device, the virtual content with at least one characteristic that corresponds to the scene information.

5. The method of claim 2, wherein generating the virtual content comprises obtaining, from a remote server and using the identifier, supplemental content information for the video content, and wherein generating the virtual content based on the obtained supplemental content information and scene information from at least one sensor of the first device.

6. The method of claim 1, wherein identifying the at least one attribute of the video content comprises identifying, at the first device, scene information for the video content based on one or more features of an image of the video content from the camera.

7. The method of claim 6, wherein generating the virtual content comprises generating, at the first device, the virtual content with at least one characteristic that corresponds to the scene information.

8. The method of claim 1, wherein identifying the scene change comprises identifying an upcoming scene change in the video content, and wherein modifying the virtual content comprises modifying the virtual content based on the upcoming scene change in the video content, prior to the scene change in the video content.

9. The method of claim 1, further comprising displaying, with the first device, a virtual barrier overlaid on an additional fixed portion of the physical environment that extends around a perimeter of the first location, wherein the second location is outside the virtual barrier.

10. The method of claim 9, wherein the virtual barrier comprises virtual content of a single color that is overlaid on the additional fixed portion of the physical environment.

11. The method of claim 1, further comprising obtaining biometric information for a user of the first device from at least one sensor of the first device, and wherein generating the virtual content comprises generating the virtual content based on the at least one attribute and the biometric information.

12. The method of claim 11, further comprising:
obtaining, with a third device, additional biometric information for an additional user of the third device;
generating additional virtual content with the third device based on the at least one attribute and the additional biometric information; and
displaying the generated additional virtual content overlaid on the second location in the physical environment while the video content is displayed at the first location.

13. The method of claim 12, wherein the virtual content is different than the additional virtual content, wherein the virtual content and the additional virtual content are displayed at a common time, and wherein the virtual content and the additional virtual content are generated to elicit a common response from the user and the additional user, respectively, at the common time.

14. A method, comprising:
obtaining, with a first device, a virtual content track that corresponds to a video track that includes video content;
obtaining biometric information for a user of the first device, while the video content is displayed at a first location in an environment of the first device;
generating virtual content with the first device based on the virtual content track and the biometric information; and
displaying, with the first device, the generated virtual content at a second location in the environment while the video content is displayed at the first location.

15. The method of claim 14, further comprising:
obtaining, with a second device, additional biometric information for an additional user of the second device;
generating additional virtual content with the second device based on the virtual content track and the additional biometric information; and
displaying the generated additional virtual content at the second location in the environment while the video content is displayed at the first location.

16. The method of claim 15, wherein the virtual content is different than the additional virtual content, wherein the virtual content and the additional virtual content are displayed at a common time, and wherein the virtual content and the additional virtual content are generated to elicit a common response from the user and the additional user, respectively, at the common time.

17. The method of claim 14, wherein the virtual content is generated to elicit a response from the user based on prior biometric information associated with the user and the response.

18. A device, comprising:
a camera;
a microphone;
one or more processors; and
memory storing instructions that, when executed by the one or more processors causes the one or more processors to:
identify, using at least one of the camera or the microphone, scene information for a video content currently playing on another device at a first location in a physical environment of the device and the other device based at least in part on one or more features of an image of the video content obtained from the camera or corresponding audio content obtained from the microphone;
generate virtual content based on the scene information;
provide the generated virtual content for display overlaid on the physical environment at a second location while the video content is currently playing on the other device at the first location;
identify, a scene change in the video content currently playing on the other device; and
dynamically modifying, the generated virtual content based on the identified scene change in the video content.

19. The method of claim 1, wherein the at least one attribute of the video content comprises at least one displayed attribute and the generated virtual content is displayed contemporaneously with the at least one displayed attribute.

20. The method of claim 1, wherein the scene information for the video content currently playing on the second device comprises identifiers of objects depicted in the video content.

* * * * *